March 28, 1933. E. I. PETERSEN Re. 18,782

LABEL

Original Filed Nov. 2, 1931

INVENTOR:
Elliott I. Petersen
BY Robt. N. Haines
ATTORNEY

Reissued Mar. 28, 1933

Re. 18,782

UNITED STATES PATENT OFFICE

ELLIOTT I. PETERSEN, OF ENFIELD, CONNECTICUT, ASSIGNOR TO BIGELOW-SANFORD CARPET CO., INC., OF THOMPSONVILLE, CONNECTICUT, A CORPORATION OF MASSACHUSETTS

LABEL

Original No. 1,850,988, dated March 22, 1932, Serial No. 572,490, filed November 2, 1931. Application for reissue filed November 3, 1932. Serial No. 640,977.

This invention relates to labels for rugs and carpets, and more particularly to a double label adapted to mark both the front and back of a rug or carpet.

It has been proposed heretofore to print or otherwise mark the back of a rug or carpet so as to display thereupon the name given the fabric, the name of the manufacturer and other desired information, but in order to read this information it is necessary to turn the rug or carpet over or fold it back.

It is desirable at times to display similar information at the face of the rug or carpet without permanently marking the face thereof. For example, when rugs are on sale and piled one on top of the other, or otherwise displayed, it may be desirable to provide means for marking them so that the maker's name and other information can be easily read at the upper face or edge of the rug, thus making it unnecessary to examine the back of the rug for this information.

Such marking means at the face of a rug would, however, be undesirable or unsightly after the rug has been sold and placed in use. It is, therefore, important that the marking means at the face of the rug be readily removable after the rug is sold, but it should be so constructed and secured in place that it is not likely to be accidentally torn off or injured prior to the sale of the rug.

The present invention, therefore, relates to a special form of label adapted to permanently mark the back of a fabric and to temporarily mark the face thereof and comprises a double label consisting of two parts, one of which is adapted to be permanently secured to the back of a rug or carpet, while the other is removably secured at the front thereof, and a foldable connection is provided between the two labels to help retain the front label in place.

The arrangement is such that the front label is positioned adjacent an edge of the rug where it can be conveniently read by looking at the same either at the edge or upper face of the rug or carpet, and may be easily examined even when the rug to which it is secured is in a stack under other rugs. After a rug having the double label of the present invention secured thereto is sold, the front label may be readily removed by severing its connection with the rear label and pulling or cutting it loose from the means that attaches it to the front face of the rug.

The various features of the present invention will be more fully understood from the following description when read in connection with the accompanying drawing illustrating one good, practical form thereof.

In the drawing:—

The double label of the present invention may be used upon rugs, carpets, and other fabrics where it is desired to provide a permanent label at one face and a removable label at the opposite face, and may be secured at either an end or selvage edge of the rug or other fabric to be marked.

In the embodiment of the invention illustrated the double label comprises an elongated strip of material and is provided at one end with the front label 1 and at the other end with the back label 2, and the intermediate portion 3 of the elongated strip is adapted to be folded about the edge of a rug or other fabric.

Figure 1:
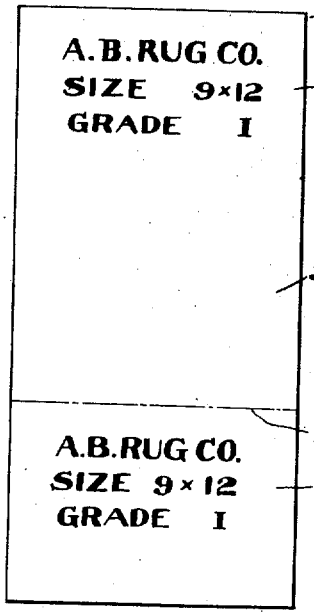
Fig. 1 is a face view of the double label of the present invention.
Figure 2:
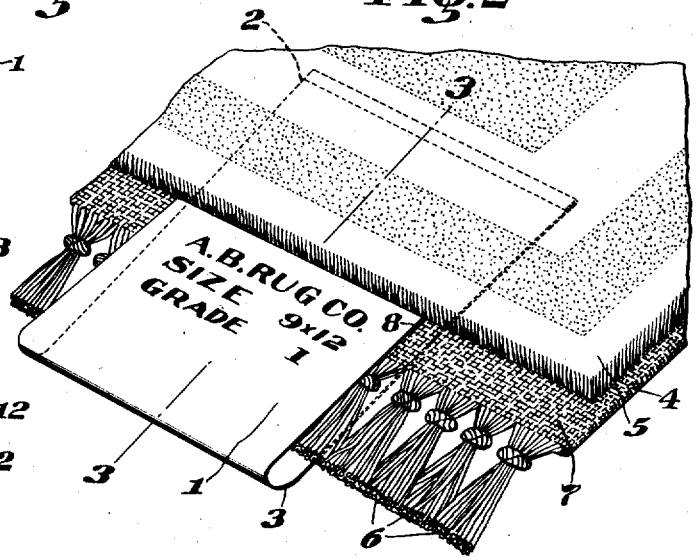
Fig. 2 is a perspective view of the end portion of a rug looking at its upper face, and provided wtih the label of the present invention.
Figure 3:
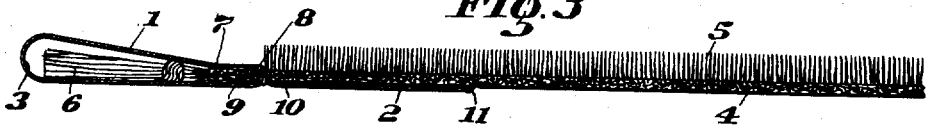
Fig. 3 is a sectional view taken on the line 3—3 of Fig. 2.
Figure 4:
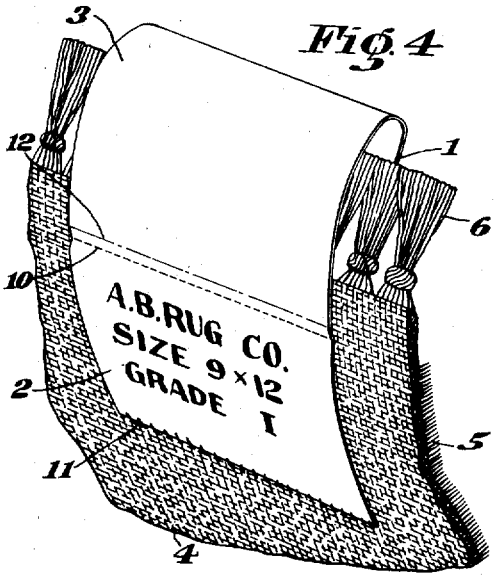
Fig. 4 is a perspective view of the portion of the rug of Fig. 1, but shows the rug turned up to disclose the label upon the back thereof.
Figure 5:
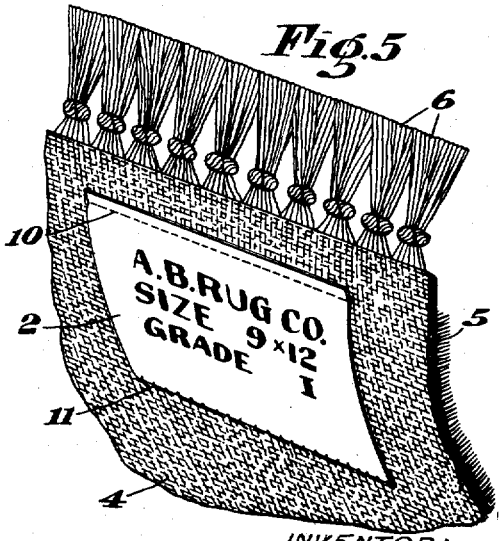
Fig. 5 is a view similar to Fig. 4 but shows the label for the front of the rug removed.

The elongated strip used in forming the label may be constructed of various materials but since the rear label 2 is intended to remain permanently secured in place, it should be constructed of durable material and both labels should present a pleasing appearance. The elongated strip may therefore be formed of woven silk or other textile material of any desired color, and the name of the manufacturer of the rug, its size, and trade-mark or other information may be printed or otherwise provided near the opposite ends of the elongated strip, as best shown in Fig. 1.

The manner in which the double label of the present invention may be attached to a rug, carpet or other fabric is illustrated in connection with the end portion of a rug having the usual backing fabric 4, pile upper face 5 and end fringe 6, and in the rug construction shown the pile 5 is omitted from the ground fabric adjacent the fringe, as indicated by 7.

The double label comprising the parts 1, 2 and 3 is conveniently secured to the rug by sewing the end of the upper label 1 to the portion of the upper face of the fabric 7 from which the pile is omitted. This is a simple sewing machine operation, and the end of the label is preferably turned under as at 8, and is secured to the backing fabric by the row of stitches 9. The intermediate portion 3 of the strip may then be looped loosely about the fringe 6, as shown, so as not to injure the fringe and secured to the back of the fabric 4 by the row of stitches 10. The remaining end portion 2 of the fabric strip may be sewed to the back of the rug as at 11. In this manner the rear label 2 is firmly bound in a flat condition to the back of the rug to permanently mark the same.

The front label 1, it should be noted, is held in place partly by the stitches 9 and partly by the looped intermediate section 3, the arrangement being such that the upper label 1 can be easily read from either the edge or upper face of the rug, and is held in an extended condition and from being accidentally folded over against the face of the pile 5 by the connection 3.

When a rug or carpet provided with the present double label is sold, the upper label 1 and intermediate portion 3 are readily removed by severing the label forming strip along a line 12 adjacent to the row of stitches 10 and by cutting or breaking the row of stitches 9 at the face of the rug.

It will be seen from the foregoing that the present label comprises a portion 2 permanently secured to the back of the fabric, a portion 1 removably secured to the face of the fabric, and an intermediate or looped portion 3 which is of sufficient size to clear the fringes 6 so as not to fold or crumple them. It will also be understood that as a result of the present construction any desired information may be displayed in a pleasing manner at both the back and front of a rug, carpet or other fabric and that this is accomplished without in any way permanently marking or injuring the face of the rug or other fabric.

What is claimed is:—

1. In combination with a floor covering, a double label formed of a relatively narrow strip of material and comprising two relatively movable end portions connected by a foldable intermediate portion, one end portion forming a back label permanently secured to the back of the floor covering, the other end portion forming a front label secured to and displayed at the upper edge of the floor covering while connected to the back label by said intermediate portion, said strip being looped around the adjacent edge of the floor covering and said intermediate portion being normally spaced from said edge.

2. In combination with a floor covering, a double label formed of textile material which is substantially narrow with respect to the floor covering and comprising two end portions connected by a foldable intermediate portion, one end portion forming a back label permanently secured to the back of the floor covering, the other end portion forming a front label secured to and displayed at the upper face of the floor covering, and retained in an extended position upon the floor covering through its connection to the back label by said intermediate portion which is folded around and extends a substantial distance beyond the edge of the floor covering and is adapted to be severed when the front label is removed.

3. In combination with a floor covering, a double label formed of a relatively narrow strip of textile fabric and comprising two end portions connected by a foldable intermediate portion looped about the edge of the floor covering at a substantial distance therefrom, one end portion forming a back label firmly secured to and permanently displayed at the back of the floor covering, the other end portion forming a front label provided with information to be displayed at the face of the floor covering, said front label being retained in place by having one edge thereof secured against the upper face of the floor covering and by its attachment to the back label through said intermediate portion that is folded around the edge of the floor covering at a substantial distance therefrom.

4. In combination with a floor covering, a double label formed of a strip of woven fabric having one end portion printed or marked to form a back label permanently sewed to the back of the floor covering and having its other end portion printed or marked to form a front label displayed at the front edge of the floor covering, and a line of stitches securing the front label at the front of the floor covering, the remaining portion of the front label being connected to the back label by an intermediate portion of the fabric strip that is looped about the edge of the floor covering at such a substantial distance from the edge of the floor covering that the label as a whole may flex relative to the edge of the floor covering.

5. In combination with a textile floor covering having a pile face, and a flexible edge fringe extending beyond the pile face, a flexible looped label formed of flexible sheet material which is relatively narrow with respect to the floor covering and comprises two end portions connected by an intermediate portion looped about and a substantial distance from and beyond the flexible edge fringe of the floor covering, and means for securing the two end portions of the label to the floor covering so as to enclose a portion of the flexible edge fringe.

In testimony whereof, I have affixed my signature to this specification.

ELLIOTT I. PETERSEN.